(12) United States Patent
Takabu

(10) Patent No.: US 6,374,607 B1
(45) Date of Patent: Apr. 23, 2002

(54) DRIVING APPARATUS UTILIZING THERMAL EXPANSION AND CONTRACTION

(75) Inventor: Atsushi Takabu, Yokohama (JP)

(73) Assignee: Leven Co., Ltd., Kanagawa (JP)

( * ) Notice: Subject to any disclaimer, the term of this patent is extended or adjusted under 35 U.S.C. 154(b) by 0 days.

(21) Appl. No.: 09/569,126

(22) Filed: May 11, 2000

(30) Foreign Application Priority Data

Jul. 28, 1999 (JP) .......................................... 11-212998

(51) Int. Cl.⁷ ................................................ F03G 7/00
(52) U.S. Cl. .......................................... 60/527; 60/516
(58) Field of Search .................. 60/527, 516; 337/333, 337/334, 335, 351; 374/187, 195; 310/307

(56) References Cited

U.S. PATENT DOCUMENTS

| | | | | |
|---|---|---|---|---|
| 2,729,756 A | * | 1/1956 | Euler et al. .................... | 60/527 |
| 3,699,769 A | * | 10/1972 | Bondurant ..................... | 60/527 |
| 4,055,955 A | * | 11/1977 | Johnson ......................... | 60/527 |
| 4,691,518 A | * | 9/1987 | Banks ............................ | 60/527 |
| 4,965,545 A | * | 10/1990 | Johnson ......................... | 60/527 |

* cited by examiner

Primary Examiner—Burton S. Mullins
(74) Attorney, Agent, or Firm—Koda & Androlia

(57) ABSTRACT

A driving apparatus utilizing thermal expansions and contractions including a high-temperature section (1), a low-temperature section (3) facing to the high-temperature section (1) with a certain gap of the gap section (2) therebetween, a bimetal section (4) interposed between the high-temperature section (1) and the low-temperature section (3) by fixing at least a part thereof to the gap section (2), a link section (5) attached to a movable portion (4a) of the bimetal section (4) and rotary driving section (6) connected to the link section (5). Another driving apparatus includes a high-temperature section (1), a low-temperature section (3) facing to the high-temperature section (1) with the certain gap of the gap section (2), a thermal expansive member (4) interposed between the high-temperature section (1) and the low-temperature section (3) by fixing both edges or peripheral parts in the longitudinal direction to the gap section (2), a link section (5) attached to a movable portion (4a) of the thermal expansive member (4) and a rotary driving section (6) connected to the link section (5).

1 Claim, 2 Drawing Sheets

DRIVING APPARATUS UTILIZING THERMAL EXPANSION AND CONTRACTION

BACKGROUND OF THE INVENTION

1. Field of the Invention

The present invention relates to a driving apparatus using a bimetal section or a thermal expansive member which expands and contracts and moves by a temperature difference and more specifically to a driving apparatus by a high-temperature section and a low-temperature section provided on both sides of the bimetal section or the thermal expansive member so as to transform the reciprocating motion into a rotary motion.

2. Prior Art

Hitherto, gasoline engines and diesel engines have been mainly used for cars, emergency power sources and others as an internal combustion engine for taking out rotary motion; and there are steam engines, stirling engines and others as an external combustion engine.

However, because the internal combustion engine uses fuel such as gasoline and gas oil, it has been a factor of contaminating the global environment. Meanwhile, although the external combustion engine uses natural thermal energy such as sun-light and may be gentle for the global environment, the steam engine is insufficient and is difficult to be miniaturized. The stirling engines hardly move unless there is a big temperature difference, and their cylinder closing structures are complicated.

SUMMARY OF THE INVENTION

Accordingly, it is an object of the present invention to provide a driving apparatus that utilizes a bimetal or a thermal expansion member wherein the bimetal or the thermal expansion member is interposed between a high-temperature section and a low-temperature section, and a link section is attached to the bimetal or the thermal expansion member which makes reciprocating motions to take out an energy as a rotary motion by the link section using a rotary driving section.

In particular, the driving apparatus utilizing thermal expansion/contraction of the present invention comprises a high-temperature section; a low-temperature section facing to the high-temperature section with a certain gap there-between; a bimetal interposed between the high-temperature section and the low-temperature section by fixing at least a part thereof in the gap section; a link section attached to a movable portion of the bimetal section; and a rotary driving section connected to the link section.

Another driving apparatus utilizing thermal expansion and contraction of the present invention comprises a high-temperature section; a low-temperature section facing the high-temperature section with the certain gap; a thermal expansive member interposed between the high-temperature section and the low-temperature section while fixing both edges or peripheral parts thereof in the longitudinal direction to the gap section; a link section attached to the movable portion of the thermal expansive mamba; and a rotary driving section connected to the link section.

DETAILED DESCRIPTION OF THE PREFERRED EMBODIMENTS

Figure 1A:
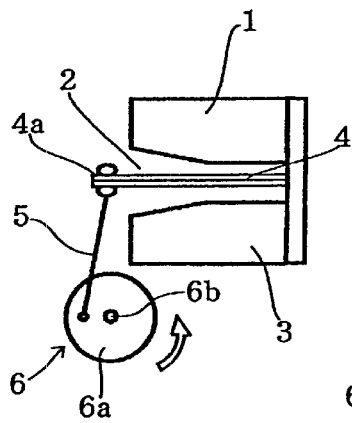
FIGS. 1A, 1B and 1C are illustrations for explaining an embodiment of the driving apparatus according to the present invention that utilizes thermal expansion/contraction.

The present invention relates to a driving apparatus using a bimetal section 4 or a thermal expansive member 4 which expands and contracts and moves by a temperature difference and more specifically to a driving apparatus utilizing thermal expansion/contraction to obtain a rotational driving source by providing a high-temperature section 1 and a low-temperature section 3 on both sides of the bimetal section 4 or the thermal expansive member 4 to cause a movable portion to have reciprocating motion and by transforming this reciprocating motion into rotary motion.

The driving apparatus utilizing the thermal expansion/contraction of the present invention comprises the high-temperature section 1, the low-temperature section 3 facing to the high-temperature section 1 with a certain gap of the gap section 2 there-between, the bimetal section 4 interposed between the high-temperature section 1 and the low-temperature section 3 while fixing at least a part thereof to the gap section 2, a link section 5 attached to a movable portion 4a of the bimetal section 4 and a rotary driving section 6 connected to the link section 5.

The driving apparatus utilizing thermal expansion/contraction of the present invention comprises the high-temperature section 1, the low-temperature section 3 facing to the high-temperature section 1 with the certain gap (of the gap section) 2, the thermal expansive member 4 interposed between the high-temperature section 1 and the low-temperature section 3 while fixing both edges or peripheral parts in the longitudinal direction to the movable portion 4a of the thermal expansive member 4 and the rotary driving section 6 connected to the link section 5.

In other words, the high-temperature section 1 and the low-temperature section 3 of the inventive driving apparatus utilizing the thermal expansions and contractions face each other having the certain gap (of the gap section) 2 and allow electrical energy or natural energy to be used as energy for raising or lowering the temperature.

Figure 1B:
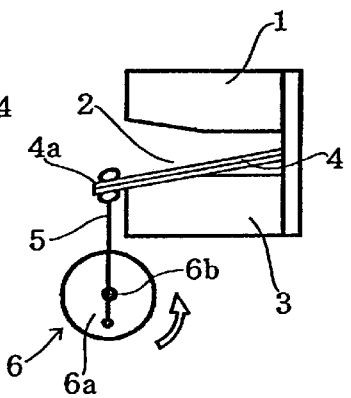
Figure 1C:
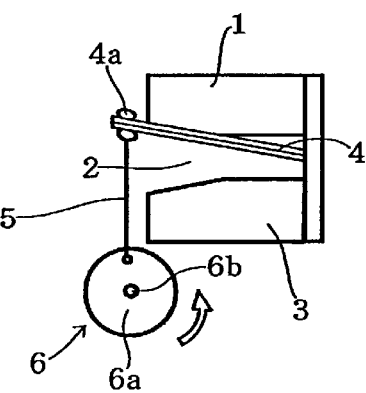

Then, as shown in the embodiment shown in FIGS. 1A through 1C, the bimetal section 4 is interposed in the gap section 2 between the high-temperature and low-temperature sections 1 and 3 while fixing at least the part thereof to the gap section 2. The rod-like basal end thereof to the gap section 2. The rod-like basal end thereof is fixed and the distal end is set as a free end. The free end composes the movable portion 4a.

The bimetal section 4 may be what two metals whose coefficient of thermal expansion are different are laminated and pasted by means of welding as is well known or be an integrated bimetal section 4 in which a magnetic metal is biased to one side and a non-magnetic metal is biased to the other side by melting the magnetic metal whose coefficient of thermal expansion is small with the non-magnetic metal whose coefficient of thermal expansion is large and by cooling them while giving magnetic force to one side. The metal having the large coefficient of thermal expansion expands more and the metal having the small coefficient of thermal expansion expands less by heating and the bimetal section 4 having the two metals having the different coefficient of thermal expansion thus binds.

One end of the link section 5 is rockably attached to the movable portion 4a and the other end of the link section 5 is turnably pivoted at an eccentric position of a rotary plate 6a of the rotary driving section 6 to take out rotary motion.

The principle of the inventive driving apparatus using the bimetal section will be explained below.

FIG. 1A shows the state before the start, wherein the bimetal section 4 is located at the center of the gap section 2 between the upper high-temperature section 1 and the lower low-temperature section 3. The metal having the large coefficient of thermal expansion is disposed at the upper part of the bimetal section 4 and the metal having the small coefficient of thermal expansion is disposed at the lower part. When the bimetal section 4 is heated, it bends to the vicinity of the lower low-temperature section 3 and the movable portion 4a moves as shown in FIG. 1B. When the bimetal section 4 is cooled by the low-temperature section 3, the movable portion 4a of the bimetal section 4 bends and moves to the vicinity of the upper high-temperature section 1 as shown in FIG. 1C. When the bimetal section 4 is heated again by the high-temperature section 1, the movable portion 4a bends and moves to the vicinity of the low-temperature section 3, thus causing reciprocating motion.

Along with the reciprocating motion of the movable portion 4a, the link section 5 connecting the movable portion 4a with the rotary driving section 6 has reciprocating motion. One end of the crank-shaft like link section 5 is rockably attached to the movable portion 4a and the other end thereof is turnably pivoted to the eccentric position of the rotary plate Ga of the rotary driving section 6. Accordingly, the reciprocating motion of the movable portion 4a of the rotary plate 6a as indicated by arrows to take out rotational energy by a rotary shaft 6b of the rotary plate 6a.

Figure 2:
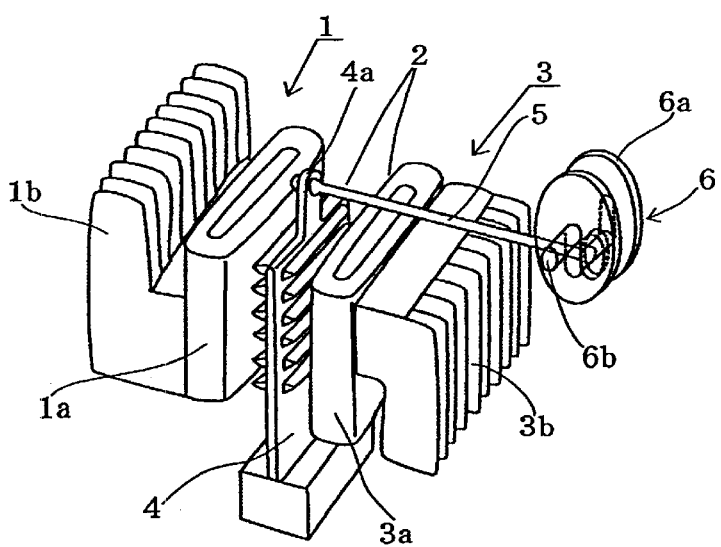
FIG. 2 is an illustration for explaining a second embodiment of the driving apparatus of the present invention that utilizes thermal expansion/contraction.

The next embodiment shown in FIG. 2 will be explained below.

The high-temperature section 1 and the low-temperature section 3 are disposed on both sides of the bimetal section 4 with the gap section 2 there-between. A high-temperature section magnetic body 1a is disposed in the high-temperature section 1 and a fluid magnetic substance is pasted around the high-temperature section fin 1b is disposed on the outside thereof. A low-temperature section magnetic body 3a is disposed in the low-temperature section 3 and a fluid magnetic substance is pasted around the low-temperature section magnetic body 3a. A low-temperature section fin 3b is disposed on the outside thereof. The fluid magnetic substance is a substance that is fluidized by applying oil to magnetic particles and makes a convection while pasting around the high-temperature section and low-temperature section magnetic bodies la and 3a when it is heated/cooled. It thus improves the efficiency of thermal conduction to the bimetal section 4.

The thermal conductive fins are provided respectively on both sides of the bimetal member to increase the surface area and to enhance the thermal conduction.

In addition to that, another embodiment shown in FIGS. 3A through 3D comprises a high-temperature section 1, a thermal expansive member 4 and a low temperature section 3 which are formed and laminated approximately in the shape of letter U and whose respective edges are fixed while having a gap 2 section at the center thereof. A movable portion 4a is disposed at the center thereof. One end of a link section 5 is attached to the movable portion 4a and the other end thereof is turnably pivoted to the eccentric position of a rotary plate 6a of a rotary driving section 6.

Figure 3A:
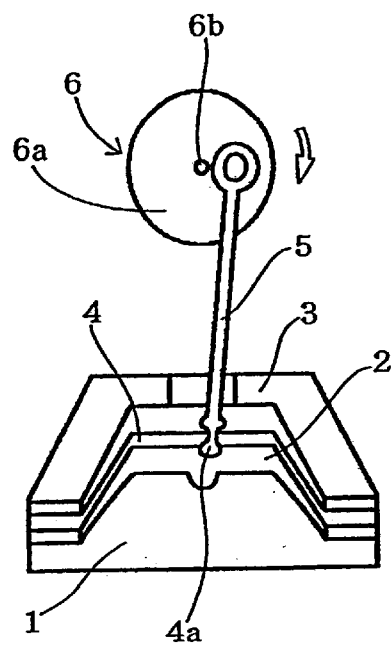
FIGS. 3A, 3B, 3C, and 3D are schematic perspective views of another embodiment of the driving apparatus according to the present invention that utilizes thermal expansion/contraction.

The high-temperature section 1 is disposed at the lower side, the low-temperature section 3 is disposed at the upper side and copper, aluminum or metal alloy having a large coefficient of thermal expansion is disposed as the thermal expansive member 4. FIG. 3A shows the state before the start, wherein the movable portion 4a of the thermal expansive member 4 is located at the center of the gap section 2 between the high-temperature section 1 and the low-temperature section 3 and the pivoted position of the other end of the link section 5 with the rotary plate 6a is located on the right side of the rotary shaft 6b in the case shown in the figure.

Figure 3B:
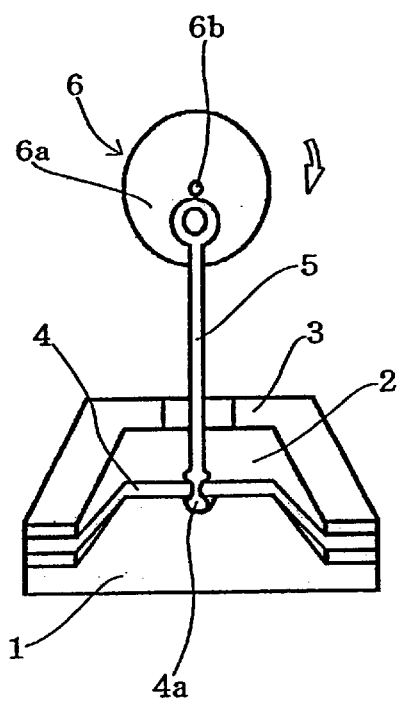

Next, FIG. 3B shows the state in which the movable portion 4a approaches the high-temperature section 1 and the thermal expansive member 4 is heated after being cooled by the low-temperature section 3, wherein the rotary plate 6a of the rotary driving section 6 turns in the direction of arrow because the link section 5 moves downward.

Figure 3C:
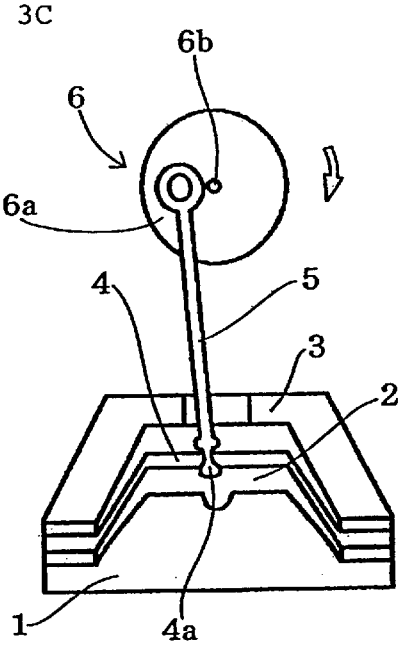

FIG. 3C shows the state in which the thermal expansive member 4 is heated by the high-temperature section 1 and is expanding, wherein the movable portion 4a of the thermal expansive member 4 moves away from the high-temperature section 1 and moves toward the low-temperature section 3. The rotary plate 6a of the rotary driving section 6 turns further in the direction of arrow in the figure by this move.

Figure 3D:
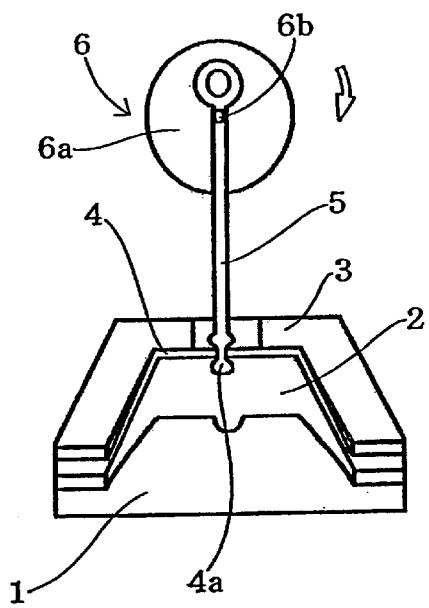

FIG. 3D shows the state in which the thermal expansive member 4 has been heated by the high-temperature section 1 and is expanding after the heating, wherein the movable portion 4a of the thermal expansive member 4 has moved away from the high-temperature section 1 toward the low-temperature section 3 and approaches the low-temperature section 3. It is then cooled by the low-temperature section 3 to move away from the low-temperature section 3 and the rotary plate 6a of the rotary driving section 6 turns in the direction of arrow in the figure by this move.

Further, although not shown in the figure, when the thermal expansive member 4 may be formed in the shape of a cup and its bottom is set as the movable portion 4a, the invention may be embodied by fixing the peripheral part of the thermal expansive member 4. It is also possible to embody the invention by using the bimetal section 4 instead of the thermal expansive member 4 in the other embodiment shown in FIGS. 3A through 3D.

FIG. 3D shows the state in which the thermal expansive member 4 has been heated by the high-temperature section 1 and is expanding after the heating, wherein the movable portion 4a of the thermal expansive member 4 has moved away from the high-temperature section 1 toward the low-temperature section 3 and approaches the low-temperature section 3. It is then cooled by the low-temperature section 3 to move away from the low-temperature section 3 and the rotary plate 6a of the rotary driving section 6

As described above, the movable portion 4a of the bimetal section 4 or the thermal expansive member 4 makes reciprocating motions by the high-temperature section 1 and low-temperature section 3, and the rotary shaft 6b of the rotary plate 6a of the rotary driving section 6 takes out the reciprocating motion as a rotary motion.

As for thermal energy of the high-temperature section 1 and the low-temperature section 3 of the inventive driving apparatus 6 utilizing the thermal expansions and contraction of the bimetal section 4 or the thermal expansive member 4, the thermal energy of the high-temperature section 1 may be obtained from sun-light and the thermal energy of the low-temperature section 3 may be obtained from sea water in the field. The invention also allows them to be obtained from bonfire and peripheral ambient. It also allows in the apace the thermal energy of the high-temperature section 1 to be obtained directly from the sun-light and the thermal energy of the low-temperature section 3 from the space wherein the sun-light is blocked.

The driving apparatus utilizing the thermal expansion and contraction of the present invention is capable of utilizing thermal energy of sun-light, bonfire and others by constructing as described above. Thus, the invention is epoch-making and is highly practical because it provides a driving apparatus which is gentle to the global environment and is effective as a driving source at the time of disaster.

What is claimed is:

1. A driving apparatus utilizing thermal expansion and contraction, comprising:

a high-temperature section;

a low-temperature section facing to said high-temperature section with a certain gap therebetween, said low-temperature section being at a lower temperature than said high-temperature section;

an elongated thermal expansion and contraction member interposed between said high-temperature section and said low-temperature section by fixing at least a peripheral part at one end thereof in the longitudinal direction in said gap between said high- and low-temperature sections, said thermal expansion and contraction member having a non-fixed movable peripheral part at an other end thereof;

a link section attached to said non-fixed movable peripheral part of the thermal expansion and contraction member; and a rotary driving section connected to said link section whereby said rotary drive section is driven.

* * * * *